April 17, 1956         R. E. MILFORD         2,742,151
AUTOMATIC CONTAINER INSPECTION EQUIPMENT
Filed March 19, 1954         3 Sheets-Sheet 1

Inventor
Richard E. Milford
by Charles W. Helzer
His Attorney

Inventor
Richard E. Milford
by Charles W Helzer
His Attorney

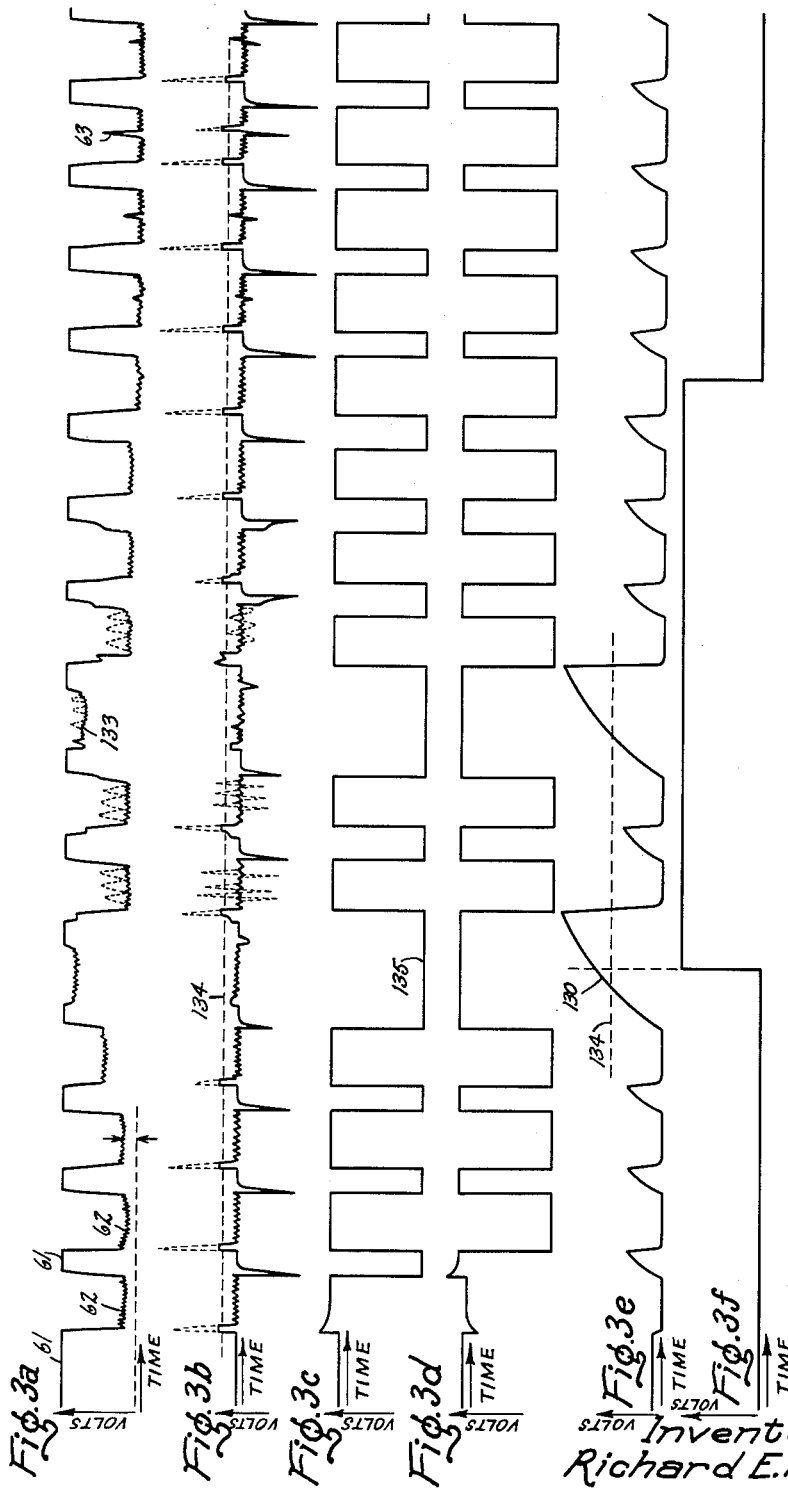

United States Patent Office 2,742,151
Patented Apr. 17, 1956

2,742,151

AUTOMATIC CONTAINER INSPECTION EQUIPMENT

Richard E. Milford, Schenectady, N. Y., assignor to General Electric Company, a corporation of New York Application March 19, 1954, Serial No. 417,372

32 Claims. (Cl. 209—111)

The present invention relates to automatic container inspection equipment.

More specifically the invention relates to improved automatically operating inspection equipment for rapidly inspecting the interior surfaces of open-ended containers, such as tin cans.

In the manufacture of containers for foodstuffs, liquids for human consummation, and etc., it is essential that the container have no defects in its construction which could adversely affect the contents. For this reason, it is necessary to inspect carefully each container at some stage in the manufacture thereof in order to insure that no defective containers are passed along to consumers. Early in the industry, such inspection was accomplished manually, and was not entirely satisfactory due to the fact that it slowed up manufacture of the containers, increased their cost, and was not entirely reliable. To overcome the above-listed objections to the manual methods of container inspection, an automatic container inspection apparatus was developed, and is described in application Serial No. 336,368—Automatic Container Inspection Equipment, Harry R. Summerhayes, Jr., Roy E. Anderson, and Ernest S. Sampson, inventors—filed February 11, 1953.

While the automatic container inspection equipment described in the above-referred to patent application is suitable for most purposes, it has not been entirely satisfactory due to the fact that it does not provide a means for storing flaw information for a period sufficient to allow completion of inspection of an entire container unit. Also, no means were provided for allowing sufficient time to elapse for the container to be removed from the inspection station and transplanted a suitable distance before a rejection mechanism was actuated to act upon such container. Further, no means were included for synchronizing the periods that the inspection beam impinged on the interior surface of a container under inspection with the energization of a suitable rejection mechanism actuating circuit. In addition, it is desirable that reliable means be provided for sensing the occurrence of a seam in the container under inspection and for desensitizing the rejection mechanism actuating circuit during the passage of the seam through the inspection zone. Because certain seam constructions do not possess the characteristics of a flaw, it is desirable that such seam sensing means be capable of inspecting the seam region where the region will not cause a false flaw signal to be produced.

It is therefore one object of the present invention to provide an improved, fully automatic inspection equipment for open-ended containers that can be incorporated readily into existing container manufacturing facilities.

Another object of the invention is to provide an improved automatic inspection equipment which includes a means for delaying activation of a rejection mechanism associated therewith for a predetermined period of time sufficient to allow a container under inspection to be removed from the inspection zone of equipment and conveyed to a position suitable for rejection.

Still another object of the invention is to provide an improved automatic container inspection equipment which will store flaw information received for a period of time sufficient to allow completion of inspection of an entire container unit before utilizing such information to activate a rejection mechanism.

Still another object of the invention is to provide an improved automatic container inspection equipment which includes a suitable means for synchronizing the period of time that an inspection beam of radiant energy impinges on the interior surface of the container under inspection with the energization of the rejection mechanism actuating circuit.

A further object of the invention is to provide an improved automatic inspection equipment having a reliable means for sensing the occurrence of seams of a certain type in a container under inspection, and which desensitizes the rejection mechanism actuating circuit during the passage of such a seam through the inspection zone of the equipment, but which has no effect on the rejection mechanism actuating circuit if the seam construction of the container under inspection is not of the type that tends to produce false reject signals.

A still further object of the invention is to provide an improved automatic inspection gauge which incorporates all of the above referred to desirable features, and which is relatively inexpensive to manufacture.

In practicing the invention, scanning means is provided for effecting a point by point inspection of the interior surface of open-ended containers and for developing an electric signal that is representative of the condition of the interior surface of the container. Such signal is preferably developed only when a container is being inspected. A rejection mechanism is provided for rejecting faulty containers after a predetermined period of time which is sufficiently long to allow the container to pass from the inspection zone to a position suitable for rejection. Means may be provided for returning the inspection equipment to its initial state of operation upon the completion of examination of a container unit under inspection. Additionally, a seam sensing circuit may be provided which serves to detect the occurrence of a seam on the interior surface of a container unit under inspection, and to develop a blanking signal. The blanking signal is utilized to insure that a false reject signal is not produced. Hence, the rejection mechanism actuating circuit will effectively be rendered insensitive upon the inspection of such a seam, but otherwise will not be effected by the seam sensing means.

Other objects, features, and many attendant advantages of this invention will better be appreciated as the same becomes better understood by reference to the following detailed description when considered in connection with the accompanying drawings, wherein like parts are identified by the same reference character, and wherein:

Fig. 3 portrays a series of graphs which illustrate signal wave shapes occurring in different portions of the circuit shown in Fig. 2.

*Overall equipment*

Figure 1:
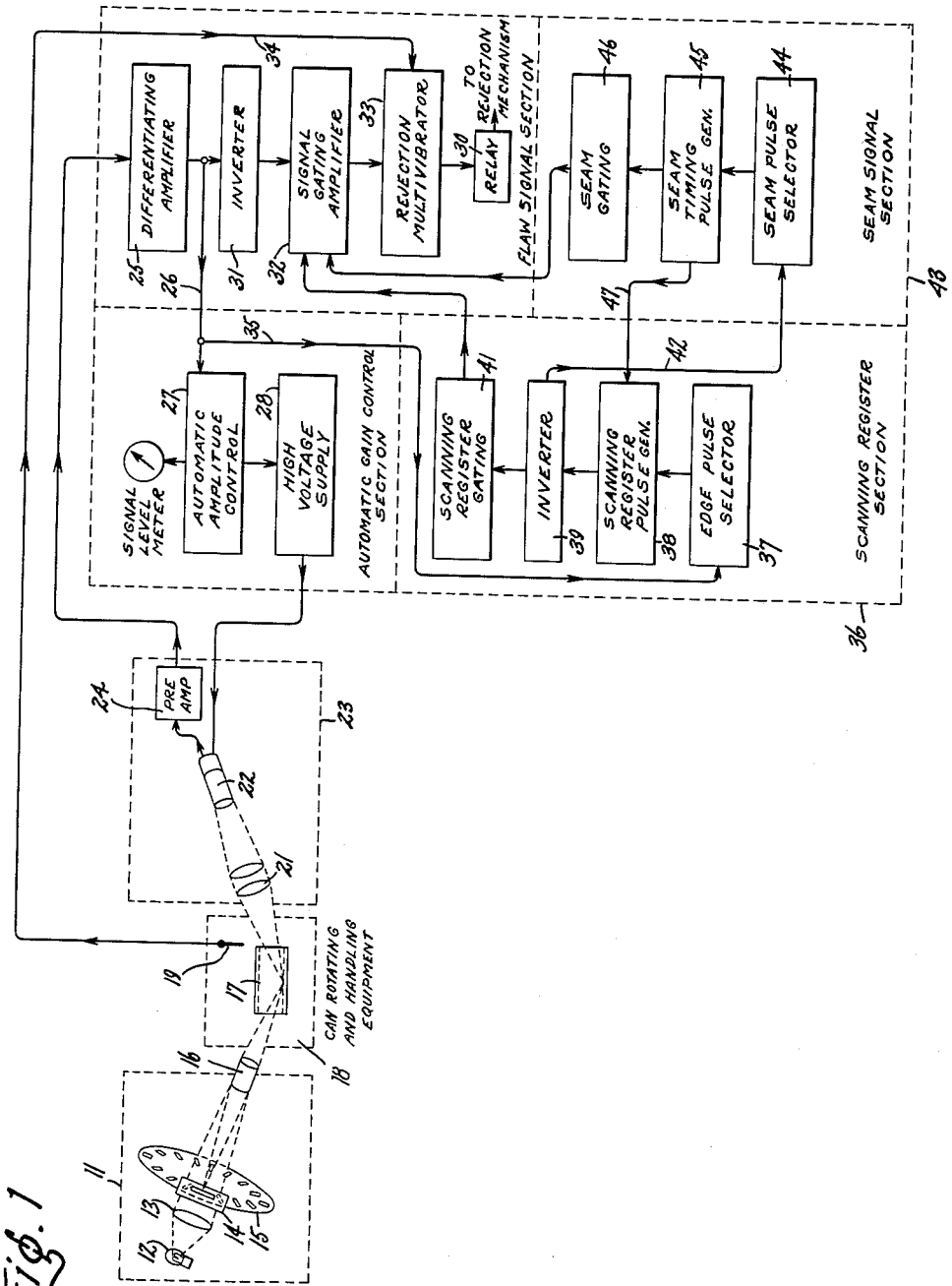
Fig. 1 is a schematic block diagram of an automatic container inspection equipment constructed in accordance with the present invention.

The automatic container inspection equipment shown in Fig. 1 comprises a radiant energy scanning means that is formed by a suitable source of radiant energy, such as a lamp 12. Light from the lamp 12 passes through a condensing lens 13 to an aperture plate 14 positioned adjacent a rotatable scanning disk 15. The construction and operation of the rotating scanning disk and aperture plate 14 are described more fully in the above-referred to application, Ser. No. 336,368; however, for present purposes it is sufficient to point out that the disk and scanning plate cooperate to produce a pencil-like beam of light that passes through a suitable projection lens 16 to the interior surface of a rotating container, such as shown at 17. The aperture plate and scanning disk 15 cause the pencil-like beam of light to be scanned back and forth lengthwise across the interior surface of the container 17 as the container is simultaneously rotated by a suitable automatic container rotating and handling apparatus, illustrated schematically at 18 so that the beam effects a point-by-point inspection of the entire inner surface of the container. This last-mentioned apparatus is designed to receive an open-ended container, rotate the same within an inspection zone wherein the pencil-like beam of light is scanned back and forth by the scanning means 11, and thereafter remove the container automatically and transfer the same to a suitable conveying apparatus for transporting the container to storage facilities. For more detailed disclosure of a suitable container rotater and handling apparatus, reference is made to any one of U. S. Patent Nos. 1,901,360, 2,403,662, or 2,354,628, all of which are capable of receiving and turning open-ended containers about the axis thereof passing through the open ends of the container, and thereafter transferring the container to a suitable conveyor. However, it is necessary that any one of the above-referred to apparatus be modified to the extent of providing a gating switch, indicated at 19, which operates to close an electrical circuit upon an open-ended container being inserted within the inspection zone by the rotating and handling equipment, and will automatically open such circuit upon the container being removed from the inspection zone. The function of this switch with relation to the overall equipment, will be described more fully hereinafter.

The pencil-like inspection beam of radiant energy produced by the scanning means 11, and directed on the interior surface of a rotating container 17, is specularly reflected from the interior surface of the container through a condenser lens 21 which directs the beam onto the photo-cathode surface of a radiant energy transducing device 22 comprising a part of the detector means 23. The radiant energy transducing device 22 preferably comprises a photomultiplier tube which has the output thereof connected through a pre-amplifying circuit 24 to the input of a differentiating amplifier 25. The radiant energy transducing device 22 and the preamplifier 24 may be mounted together in a suitable container that is located on the production line facility along with container and rotating handling equipment 18, and the output of the preamplifier 24 is supplied through a length of conductor such as a coaxial cable to the input of the differentiating amplifier 25. Differentiating amplifier 25 may then be located in a separate electronic cabinet at a remote control station along with remaining elements of the automatic container inspection equipment to be described hereinafter. The output of differentiating amplifier 25 is connected through a conductor 26 to the input of an automatic amplitude control circuit 27 which is connected in electrical circuit relationship with the voltage supply source 28, and which supplies energizing potential to the photomultiplier tube 22. By this construction, the control circuit modifies or controls the energizing voltage supplied to the photomultiplier tube 22 at some predetermined desired level.

The output of differentiating amplifier 25 also is connected through a phase inverting amplifier 31 to a signal gating amplifier 32, the purpose of which will be described more fully hereinafter. Signal gating amplifier 32 serves to couple the output of the phase inverting amplifier 31 to the input of a bi-stable multivibrator 33, that normally has two stable states of operation. The bi-stable multivibrator 33 has a connection through a conductor 34 back to the switch contacts of the gating switch 19 incorporated into the container rotating and handling equipment 18. The switch contacts of gating switch 19 are normally closed by a container being inserted in the inspection zone of the equipment, and are connected in the multivibrator circuit 33 by the conductor 34 in a manner such that switch 19 serves to interrupt the operation of the multivibrator upon the switch contacts being opened by the removal of a container from the inspection zone by the rotating and handling equipment 18. Bi-stable multivibrator 33 is normally in the first stable state of operation thereof, and is switched to the second state of operation upon the occurrence of a flaw signal produced by a defect appearing in the surface of a container under inspection. The bi-stable multivibrator is then returned to the first stable state of operation thereof by the opening of the contacts of gating switch 19 upon the removal of the container from the inspection zone. The output of bi-stable multivibrator 33 is then connected to a suitable relay actuating circuit 30 that may comprise a gas controlled discharge device connected to the coil winding of a solenoid operated relay for controlling a rejection mechanism, not shown. The gas controlled discharge device is actuated by the change of state of multivibrator 33 such that initiation occurs immediately following the end of inspection of a defective container. The container is consequently in a definite phase position in the operating cycle of the handling equipment at this time no matter at what point in the cycle the flaw was detected. This makes it possible to reject a defective container after a period of time or phase delay determined by the point in the operating cycle of the handling equipment at which the defect is detected.

Differentiating amplifier 25 has a third output connection supplied through a conductor 35 to the input of a scanning register signal developing circuit indicated at 36. This circuit preferably comprises a leading edge pulse selector circuit 37, to be described more fully hereinafter, having the output thereof connected to a scanning register pulse generator 38. Generally speaking, the scanning register pulse generator 38 has one stable state of operation, and normally operates in that state. Upon the application of a leading edge signal pulse thereto from the input conductor 35 and leading edge pulse selector circuit 37, the pulse generator 38 is switched to a second, unstable operating state thereof for a predetermined period of time related to the time required for the inspection beam of radiant energy to complete one scanning cycle whereupon the pulse generator automatically returns to its first, stable operating state. If desired, a means for controlling or varying the operating period of pulse generator 38 may be supplied. The output of the pulse generator 38 is supplied through a phase inverting amplifier 39 to an input terminal of the signal gating amplifier 32 through a suitable coupling circuit 41.

From the foregoing description, it can be appreciated that the scanning register signal developing circuit 36 serves to develop a scanning register gating signal which is applied to the signal gating amplifier 32 to render the same sensitive during those portions of the inspection scanning beam travel where the inspection beam impinges upon the interior surface of the rotating container being inspected. Hence, the signal gating amplifier 32 will not have a sensitizing scanning register signal supplied thereto from circuit 36 during other portions of the travel of the scanning inspection beam, and cannot pass signal pulses from the phase inverting amplifier 31 to the bistable multivibrator 33.

The output of phase-inverting amplifier 39 also is supplied through a second conductor 42 to the input of a seam sensing circuit indicated generally at 43. The seam sensing circuit 43 comprises a seam pulse selector circuit 44 which serves to select out the pulsed electric signal produced by the radiant energy transducing device 22 upon the occurrence of a seam in a container under inspection. The seam pulse selector circuit then supplies a triggering pulse to a seam timing pulse generator 45 having its output connected through a suitable coupling circuit 46 to the signal gating amplifier 32 to control the action of the signal gating amplifier in conjunction with the scanning register signal developing circuit 36. Seam timing pulse generator 45 is similar in construction and operates in the same manner as the scanning register pulse generator 38. The seam timing pulse generator 45 also has a second output signal supplied through a feedback conductor 47 to the input of the scanning register pulse generator 38 for the purpose of providing timing control signal thereto. This timing control signal serves to vary the period of the scanning register gating signal produced by the scanning register pulse generator upon the occurrence of a seam in the container under inspection so as to reduce the length of the time that the signal gating amplifier 32 is sensitized by the scanning register signal supplied thereto from circuit 36. The purpose of the automatic timing signal provided by the conductor 47 is to make it possible for seam inspection on those containers which do not have "internal Groenke notches," that is, containers whose seam constructions do not appear as flaws. At the ends of the seam of such containers are "tabs" and irregularities which would appear similar to flaws, and therefore in order to have inspection of their seams, the signal gating amplifier must be energized for a shorter time. Alternatively, on those cans with notches or other seam characteristics in the central region of the seam which appear similar to flaws, the seam sensing circuit 43 provides a desensitizing signal to the signal gating amplifier 32 so as to desensitize amplifier 32 upon the occurrence of the seam, thereby rendering it impossible for the signal pulse to be supplied through the gating amplifier from amplifier 31 to the bi-stable multivibrator 33.

Briefly, the operation of the overall improved automatic container inspection equipment is as follows:

The containers to be inspected are supplied one-by-one from the container and rotating handling apparatus 18 to the inspection zone where they are rotated at a relatively slow rate. An inspection beam of radiant energy or light produced by the scanning means 11 is caused to be scanned back and forth longitudinally along axis of the container at a rate that is relatively fast in comparison to the rotation of the container. Due to the combined action of the radiant energy scanning means and the rotation of the container, the inspection beam of radiant energy is caused to effect a point-by-point inspection of the entire inner surface of the container. This inspection beam of radiant energy is specularly reflected from the interior surface of the container into a radiant energy transducing device 22. As long as the interior surface of the container is smooth and without defects, this specularly reflected beam of radiant energy will have some predetermined intensity. Upon the occurrence of a flaw in the interior surface of the container, however, the intensity of specularly reflected beam of radiant energy is decreased so as to produce a pulsed output signal in the radiant energy transducing device which is amplified by the preamplifier 24 and supplied to differentiating amplifier 25. Differentiating amplifier 25 differentiates and amplifies the pulsed electric signal thus produced, and supplies the same through conductor 26 to the automatic amplitude control circuit, through phase inverting amplifier 31 and signal gating amplifier 32 to the bistable multivibrator 33, and through the conductor 35 to the input of the scanning register signal developing circuit 36. The automatic amplitude control circuit 27 serves to vary the energizing voltage supplied to the photomultiplier tube 22 by the voltage supply source 28 so as to maintain the peak amplitude of the pulsed leading and following edge pulse signals at some predetermined amplitude. The leading and following edge signals are produced when the scanning inspection beam of radiant energy first reaches the leading edge nearest scanning means 11 of the container under inspection and as the inspection beam goes beyond the following edge of the container remote from scanning means 11. The differentiated and amplified signal is also supplied through conductor 35 to the scanning register signal developing circuit 36. This circuit serves to select out the leading edge pulse signal, and utilized this peak voltage to trigger off the scanning register pulse generator 38. The scanning register pulse generator 38 then produces a prolonged square wave pulse electric signal that is supplied through the phase inverting amplifier 39 and coupling circuit 41 to the signal gating amplifier 32 to thereby gate the amplifier 32 on so as to render it sensitive to flaw signal pulses produced as a result of a flaw occurring in the surface of the container under inspection.

The scanning register pulse generator 38 is adjusted so that the period of the square wave gating pulse produced by it corresponds to the length of time required for the scanning inspection beam to travel from the leading or nearest end or edge of the container under inspection to the following or furthermost edge, thus completing one scanning cycle. Hence, the scanning register signal developing circuit serves to sensitize the signal gating amplifier 32 for a period of time corresponding to the travel of scanning inspection beam of radiant energy over the interior surface of the container.

The output of scanning register pulse generator 38 also is supplied through the conductor 42 to the input seam sensing circuit 43. The seam sensing circuit 43 includes seam pulse selector 44 which serves to select out a characteristic pulse representative of the occurrence of a seam on the surface of the container under inspection. This seam pulse is then used to trigger a seam timing pulse generator which produces a seam timing gating pulse that is supplied through coupling circuit 46 to the signal gating amplifier 32 to render the same inoperative during the passage of the seam through the inspection zone. Seam timing pulse generator output is also supplied through the feedback conductor 47 to the scanning register pulse generator 38 to reduce temporarily the length of time that the scanning register pulse generator renders the signal gating amplifier 32 sensitive. The exact purpose of this feedback connection will be described more fully hereinafter in connection with the description of the detailed circuit diagram of the equipment.

From the foregoing description it can be appreciated that the signal gating amplifier 32 is rendered sensitive upon the scanning inspection beam of radiant energy reaching the near edge of the container under inspection, so that as the scanning inspection beam travels through its scanning cycle along the interior surface of the container, should a flaw signal be produced due to the occurrence of a flaw in the surface, such flaw signal will be passed through signal gating amplifier and trigger off the bi-stable multivibrator 33. Bi-stable multivibrator 33 then produces an output indication signal which operates the rejection mechanism relay 30. During the rotation of the container while such scanning cycles are being carried out, a seam will pass into the inspection zone, and upon this occurrence, the seam sensing circuit 43 desensitizes the signal gating amplifier so that flaw signals will not be passed through to the bi-stable multivibrator 33. Hence, false rejection signals will not be produced at the output of the multivibrator 33 by reason of the occurrence of the seam.

*Detailed description.—Detector circuit*

Figure 2:
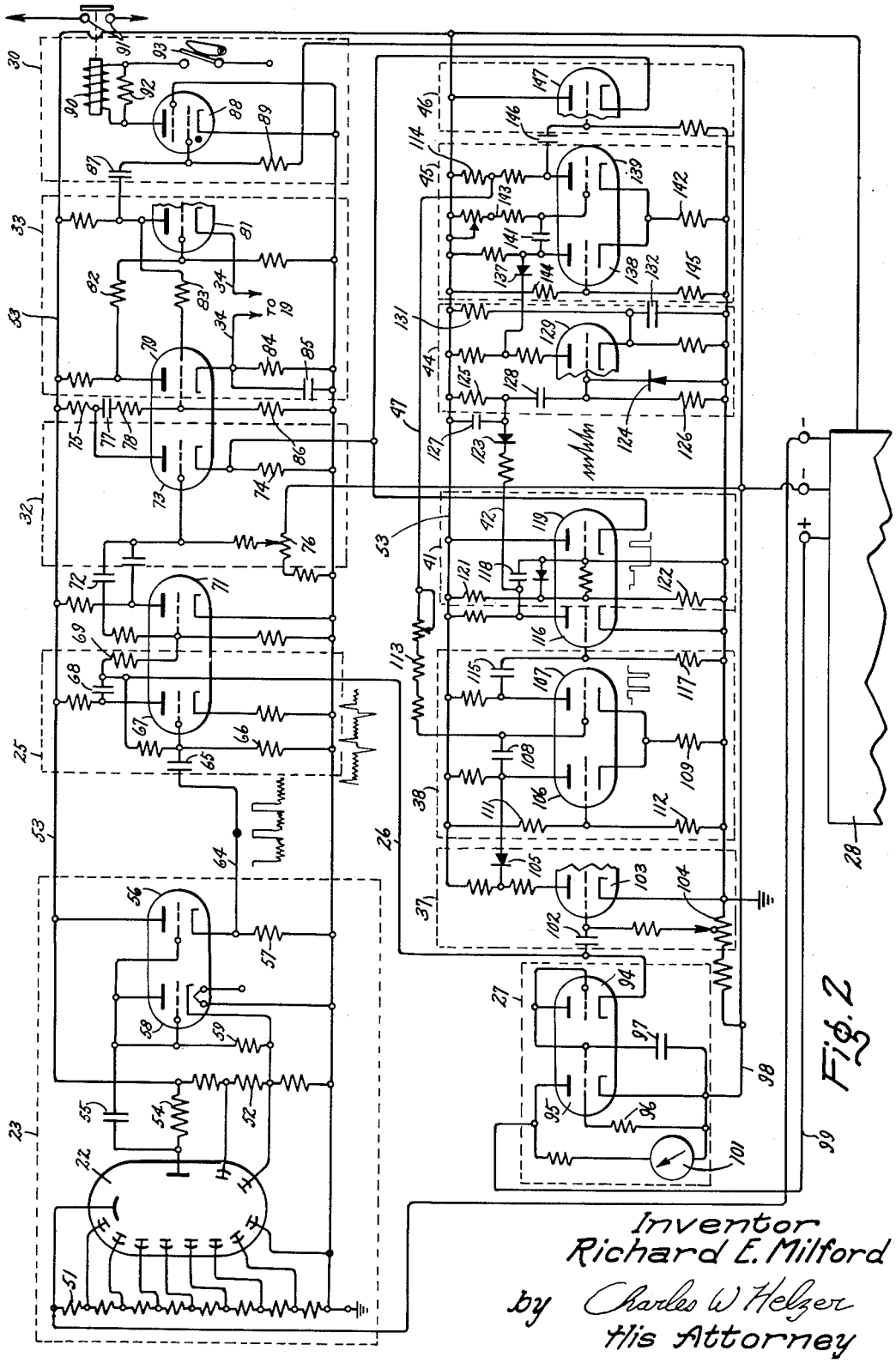
Fig. 2 is a detailed circuit diagram of the detector portion of the equipment shown in Fig. 1.

Referring now to Fig. 2, a more detailed disclosure of applicant's invention is shown wherein it can be seen that the improved automatic container inspection equipment includes a radiant energy transducing means 22 that preferably comprises a photomultiplier tube. The photomultiplier tube 22 is energized from a power supply source 28 that supplies a high negative potential to a voltage dividing resistor 51. The photocathode of the photomultiplier tube 22 is connected to the high negative potential end of the voltage dividing resistor 51, and the dynodes of the tube are connected to intermediate points along the resistor. The anode or collecting electrode along with the last two dynodes of the photomultiplier tube are connected to a second voltage divider resistor 52 that is connected between ground and a source of positive plate potential obtained from the power supply 28 through a suitable plate potential conductor 53. The anode or collecting electrode of the photomultiplier tube 22 is connected to the high positive end of the voltage dividing resistor 52 while the last two dynodes of the photomultiplier are connected to intermediate points thereof. A load resistor 54 is connected intermediate the anode and the positive high voltage end of the voltage dividing resistor 52, and serves to develop an output electric signal thereacross which is supplied through a coupling capacitor 55 to the control grid of a cathode follower amplifier formed by a triode section 56 of a duo-triode tube. The triode section 56 has a suitable load resistor 57 connected to the cathode thereof, and has the anode thereof connected directly to the source of positive potential supplied through conductor 53. The control grid of the triode section 56 is clamped to a predetermined direct current potential by means of a diode clamping tube formed by the remaining triode section 58 of the duo-triode. For this purpose, triode section 58 has the anode and control grid thereof interconnected directly to the control grid of triode section 56, and has the control grid further connected to one end of a suitable biasing resistor 59 having its other end connected to the cathode of triode section 58. The cathode of the triode clamping tube 58 is also connected to an intermediate point on the voltage divider 52, so that upon the triode section 58 being rendered conductive, the control grid of the triode section 56 is clamped substantially to some potential dependent upon the point of connection of the cathode of triode section 58 to voltage divider resistor 52.

In operation, an output signal current proportional to the instantaneous value of the reflected light impinging on the photocathode of photomultiplier tube 22, is developed across load resistor 54 as the scanning operation is carried out. Referring now to Fig. 3 of the drawing and to Fig. 3a particularly, the output wave shape of this output electric signal is depicted. As is shown in Fig. 3a, when no light is impinging on the photomultiplier tube 22, the output signal or electric potential supplied to the control grid of the cathode follower amplifier 56 is at a level 61. Upon light being reflected into the photomultiplier tube 22, this potential drops to some value shown at 62, and depicts what happens to the signal level upon the scanning inspection beam of radiant energy reaching the edge of the rotating container under inspection. Signal level remains at the value shown at 62 until such time that the scanning inspection beam reaches the following or furthermost edge of the container under inspection, whereupon radiant energy is no longer specularly reflected by the container surface into photomultiplier 22, and the direct current potential rises again to the value shown at 61. This is repeated on the next scanning cycle of the inspection beam of radiant energy so that essentially a series of large amplitude square wave leading edge and following edge signal pulses 61 are produced in the output signal supplied through coupling capacitor 55 to the control grid of cathode follower amplifier 56. Should a defect appear upon the surface of the container under inspection, such defect will produce a sharp flaw signal pulse such as is shown at 63. During this operation, the diode clamping tube formed by triode section 58 of the duo-triode, operates to maintain the maximum value of the potential supplied to the control grid of triode section 56 at some predetermined level. Should the value of the signal amplitude supplied to the control grid of triode section 56 rise above this predetermined level, the diode clamping tube 58 is rendered conductive, and serves to clamp the control grid of section 56 to the value of the potential obtained from the voltage divider 52.

From the foregoing description it can be appreciated that the cathode follower amplifier 56 serves as a preamplifier, and that the output signal appearing across its cathode load resistor 57 is preamplified. The preamplified output signal is supplied through a suitable conductor 64 to the remaining portions of the equipment. As previously stated, the photomultiplier tube 22 and preamplifier 56 may be located along with the scanning unit and the container rotating and handling equipment at a satisfactory location on the production line for the containers. The output signal produced by preamplifier 56 may then be connected through the conductor 64, which may be a relatively long conductor, to the remaining portions of the equipment be located in an electronic cabinet at a remote control station.

The output signal supplied through conductor 64 is coupled to a differentiating amplifier formed by a differentiating circuit comprised of a capacitor 65 and a resistor 66. The junction of the capacitor 65 and the resistor 66 is connected to the control grid of the triode amplifier 67 which is preferably a feedback stabilized amplifier. The output of differentiating amplifier 67 is fed through a coupling capacitor 68 and a current limiting resistor 69 to the control grid of a triode section 71 of a duo-triode tube. Triode section 71 comprises a feedback stabilized amplifier that serves to invert the phase of the output signal supplied from differentiating amplifier 67, and supplies an output phase inverted signal through a coupling capacitor 72 to the control grid of a triode section 73, to be described more fully hereinafter. From the foregoing description it can be appreciated that the differentiating circuit 65, 66 serves to differentiate the substantially square wave, pulsed electric signal supplied thereto from the preamplifier 56, and that amplifiers 67 and 68 serve to amplify and invert the phase of this differentiated signal. The output signal from these elements of the equipment is illustrated in Fig. 3b.

*Gating device*

The triode section 73 has a cathode thereof connected to ground through suitable load resistor 74, and has the anode thereof connected through a plate load resistor 75 to the source of positive potential supplied by conductor 53. The control grid of triode section 73, in addition to being connected through capacitor 72 to the output of phase-inverting amplifier 71, also is connected through a current limiting resistor to the adjustable tap or contact of a variable resistor 76 connected between the ground and a source of low value negative potential. The variable resistor 76 serves to supply the control grid of the triode section 73 with a biasing potential which must be overcome by the positive signal pulses supplied to the control grid from the phase inverting amplifier 71 before the signal gating amplifier 73 can be rendered conductive. By this adjustment, then, the signal gating amplifier 73 can be rendered insensitive to all flaw signals except those having a value equal to or greater than the value of the bias supplied by the variable resistor 76. Hence, the variable resistor 76 serves as a flaw sensitivity control apparatus. In addition to the bias provided from the variable resistor 76, two other control signals are supplied to the signal gating amplifier 73 across the cathode load resistor 74. The manner in which these control signals control gating amplifier 73, and the way in which they are derived, will be described more fully hereinafter.

*Rejection mechanism actuating circuit*

The output of gating amplifier 73 is coupled through a coupling capacitor 77 and a resistor 78 to the control grid of a triode section 79 of a duo-triode. Triode section 79 comprises one part of a two triode bi-stable multivibrator further comprised by a triode section 81 having the control grid thereof connected through a resistor 82 to the anode of the triode section 79, and having the anode thereof connected through a resistor 83 to the control grid of the triode section 79. The cathode of triode section 81 is connected through a conductor 34 which includes the contacts of the gating switch 19 mounted on the container rotating and handling equipment 18, back to the cathode of the triode section 79. Triode section 79 has a resistor 84 and a capacitor 85 connected in parallel circuit relationship between the cathode and ground terminal, and suitable plate potentials are supplied to the anodes of each of the triode sections 79 and 81 through respective plate load resistors. A biasing potential is applied to the control grid of section 79 through a voltage dividing network formed by the plate resistor 75, coupling capacitor 77, resistor 78, and a third resistor 86 connected in series circuit relationship between the ground terminal and the source of positive potential supplied through conductor 53. In operation, the positive bias applied to the control grid of the triode section 79 by the voltage dividing network keeps that triode section normally conductive. Conduction through the triode section 79 causes a positive bias potential to be built up across resistor 84 which is supplied back to the triode section 81 through the conductor 34 and the closed contacts of the gating switch 19 to thereby render the triode section 81 non-conducting. Upon the appearance of a flaw in the container under inspection, a flaw signal such as indicated at 63 in Fig. 3a, is produced, and is supplied through the signal gating amplifier 73 to the control grid of the triode section 79. This flaw signal is negative in character (with respect to ground) so that it renders triode section 79 temporarily non-conductive and removes the positive bias supplied to the cathode of triode section 81 by resistor 84. Upon the triode section 79 being rendered non-conductive, a positive signal pulse is supplied from the plate thereof through the resistor 82 to the control grid of the triode section 81 thereby rendering the triode section 81 conductive. Conduction of the triode section 81 causes a positive potential to be built up across resistor 84 which keeps the triode section 79 non-conductive. This condition is maintained thereafter throughout the remainder of the scanning cycle in which a flaw signal occurs until completion of inspection of the container unit. When the container unit is completely inspected, it is removed by the container rotating and handling equipment whereupon the contacts of the gating switch 19 are opened, thereby rendering triode section 81 non-conductive and allowing positive bias appearing across resistor 84 to dissipate. Thereafter triode section 79 is again rendered conductive by reason of the positive bias supplied thereto from the voltage dividing network formed by resistors 75, 78, 86, and capacitor 77. Upon the succeeding container to be inspected being inserted by the container rotating and handling equipment 18, the contacts of the gating switch 19 again close, and the multivibrator is returned to its initial or first operating state, thus completing the cycle. From this description, it can be appreciated that after the multivibrator formed by the triode sections 79, 81 has been triggered by flaw signals from its first stable state of operation to the second stable state of operation, flaw signals that are produced thereafter by the particular container units under inspection, can no longer effect the multivibrator. Hence, the multivibrator serves to store the flaw signal for the period of time required for the completion of inspection of one container unit.

The anode of the triode section 81 of the bi-stable rejection multivibrator is coupled through a coupling capacitor 87 to the control grid of a grid control gas discharge tube 88. The control grid of the gas discharge tube 88 also has a negative bias applied thereto through a resistor 89 from a source of negative potential obtained from the power supply unit 28. The anode of discharge tube 88 is connected to a source of positive plate potential through the energizing winding 90 of a solenoid operated relay having fixed contacts 91 connected in a reject mechanism control circuit, and through a cam operated switch 93. A time delay reactance is formed by a resistor 92 that is connected in parallel circuit relationship with the energizing winding 90 of the reject mechanism control relay for a purpose to be described more fully hereinafter.

In operation, upon the triode section 81 being rendered conductive due to occurrence of a flaw in a container under inspection, a differentiated negative pulse is supplied through the coupling capacitor 87 to the control grid of the gas discharge tube 88. The negative pulse, in conjunction with the negative potential supplied from the power supply 28 through resistor 89 is not sufficient to affect the gas discharge tube. Hence, the gas discharge tube will not be rendered conductive, and the relay will not be actuated. However, upon the container unit in which the flaw occurs being removed by the container rotating and handling equipment 18, the gating switch contacts 19 are opened, thus rendering the triode section 81 non-conductive. This action allows the anode of the triode section 81 to be driven positive at a very rapid rate, and produces a positive going voltage pulse which is supplied through the coupling capacitor 87 to the control grid of the gas discharge tube 88, and renders the gas discharge tube 88 conductive. Conduction through gas discharge tube 88 then supplies an energizing current through the energizing winding 90, and cam operated switch 93. The cam operated switch 93 is tied in with the operation of the gating switch 19 so that the switch automatically opens just prior to the gating switch 19 being closed, and automatically closes just prior to the gating switch being opened. Hence, the cam operated switch will be closed so that gas discharge tube 88 can conduct, thereby energizing the coil winding 90, and actuating rejection mechanism relay. Because of the time delay resistor 92, connected in parallel with coil winding 90, the relay will be retained in the actuated position for a predetermined period of time, depending on the time constant of the circuit formed by the resistor 92 and the energizing winding 90, thereby allowing the relay to remain energized until the defective container under inspection reaches and passes through a region where it can be conveniently rejected or otherwise acted upon. Subsequently, the above-referred interconnecting mechanism between the gating switch 19 and the cam operated switch 93, opens the cam operated switch 93 to render the gas discharge device 88 non-conductive, thereby rendering the rejection circuit again ready for operation to repeat the above-described cycle.

*Automatic amplitude control circuit*

The output of differentiating amplifier 67 also is supplied through a conductor 26 to the cathode of the triode section 94 of a duo-triode tube. Triode section 94 has the control grid and anode thereof interconnected to form a diode, with the interconnected control grid and anode being connected to the control grid of the remaining triode section 95. Triode section 95 has the control grid thereof connected to its cathode through a parallel resistor-capacitor network comprising a resistor 96 and a capacitor 97, with the cathode of the triode section being connected through a conductor 98 to a negative terminal of the power supply 28. The anode of the triode section 95 is connected through a second conductor 99 to a positive terminal of the power supply 28 in a manner such that the triode section 95 is connected in series circuit relationship with the source of high negative potential supplied to the photomultiplier tube 22. If desired, an indicating instrument 101 may be connected across the triode section 95. By reason of the construction described above, the triode section 94 operates as a diode rectifier to rectify the transmitted signal supplied thereto from differentiating amplifier 67 through conductor 26. The rectified signal produced by diode rectifier 94 is supplied to the control grid of triode section 95 which by reason of the connection of the capacitor 97 and resistor 96 thereto operates as a variable reactance tube. This variable reactance tube is connected in series circuit relationship with the power supply to the photomultiplier tube 22 to regulate the power supplied thereto. Hence, any undersired variations in the background level of the output signal produced by the photomultiplier tube 22 will appear in the output of the differentiating amplifier 67, and will be supplied through rectifier 94 to the reactance tube 95 to vary the reactance of tube 95 in the manner such to compensate for variations in the background level of the output signal of photomultiplier 22 to thereby maintain the background level of the output signal supplied thereby essentially constant.

*Scanning register signal developing circuit*

A third output connection is provided from the differentiating amplifier 67 through the conductor 26 and a coupling capacitor 102 to the control grid of a triode section 103 of a duo-triode tube. The cathode of triode section 103 is connected directly to ground, and the anode thereof is connected through a suitable plate load resistor and conductor 53 to a source of positive plate potential. The control grid of triode section 103 also has a negative bias supplied thereto from a variable resistor 104 connected between ground and a source of low value negative potential supplied from power supply 28. The function of the biasing resistor 104 will be explained more fully hereinafter, however, briefly, it might be stated that it is used to adjust the sensitivity of triode section 103 for the purpose of sensing the occurrence of seams on the interior surface of a container under inspection. Otherwise, the triode section 103 serves to amplify the differentiated signal supplied thereto from differentiating amplifier 67, and to couple the amplified and differentiated trigger signal to the input of the scanning register signal pulse generator. For this purpose, the output of triode section 103 is coupled through a unidirectional coupling device comprising a rectifier 105 to the plate electrode of a triode section 106 of a duo-triode tube further comprised by a triode section 107. The plate electrode of triode section 106 is coupled through a coupling capacitor 108 to the control grid of triode section 107, and the cathode electrodes of each of the triode sections 106, 107 are connected to ground through a common cathode load resistor 109. The anodes of each of the triode sections 106, 107 are coupled through respective plate load resistors and conductor 53 to the source of positive plate potential 28, a grid biasing potential is provided to the control grid of triode section 106 from a voltage divider comprised by a pair of resistors 111 and 112 connected in series circuit relationship between the conductor 53 and the ground terminal. The circuit thus comprised by the triode sections 106, 107 forms a pulse generator. In operation, the positive potential supplied to the control grid of triode section 106 by voltage dividers 111 and 112 renders that section normally conductive, thereby producing a positive bias across the common cathode load resistor 109 which maintains the triode section 107 in a non-conducting condition. Upon the application of a negative pulse to the plate electrode of the triode section 107 from the triode section 103, the triode section 106 is rendered non-conductive. Upon this occurrence, the rise in plate potential of triode section 106 produces a positive voltage pulse that is coupled through coupling capacitor 108 to the control grid of triode section 107 to thereby render triode section 107 conductive. Conduction through triode section 107 produces a positive bias across common cathode resistor 109 which maintains the triode section 106 nonconductive for a predetermined length of time. This length of time is determined by the time constant of the resistor-capacitor charging circuit formed by the capacitor 108, a variable resistor 113, a fixed resistor 114 connected in series circuit relationship between the source of positive plate potential and the control grid of triode section 107 by a conductor 47. By reason of this construction, the series-connected resistors 113 and 114 constitute a leakage path for the capacitor 108, and allows the charge on the capacitor to leak off at a rate determined by the value of the resistors. This leakage rate may be varied by varying the variable resistor 113. Hence, the positive potential applied to the control grid of triode section 107 by capacitor 108 leaks off through the path identified at a rate which can be adjusted to keep the duration of the square wave output obtained from the plate of triode section 107 at a value proportional to the time required for the scanning inspection beam of radiant energy to complete one scanning cycle of a container under inspection, and is dependent upon the length of the containers to be inspected as well as the rate of travel of a pencil-like inspection beam of radiant energy.

The output of the pulse generators 106, 107 is supplied through a phase coupling capacitor 115 to the control grid of a triode section 116 which forms a phase converting amplifier, and has the cathode thereof connected directly to the ground bus treminal and the plate thereof connected through a suitable plate load resistor to the source of positive plate potential. The capacitor 115 in conjunction with a grid resistor 117 forms a grid biasing circuit for the phase inverting amplifier 116. The output of amplifier 116 is supplied through coupling capacitor 118 to the control grid of a triode section 119 having the anode thereof connected through conductor 53 directly to the source of positive plate potential, and the control grid thereof connected to a grid biasing network comprising a voltage divider formed by a pair of resistors 121 and 122 connected between ground and the source of positive plate potential. The cathode of triode section 119 is connected through an output conductor to the cathode load resistor 74 of gating triode 73 which constitutes a common load resistor for both the triode section 73 and the triode section 119. By reason of the phase inverting amplifier 116, the polarity of square wave scanning register signal supplied from the pulse generator 38 is such to produce a negative polarity signal across the common cathode load resistor 74. Hence, the signal gating amplifier 73 is rendered sensitive while a square wave scanning register signal is supplied to the cathode load resistor 74 thereof from the scanning register pulse generator 38. In this manner, the sensitizing of the signal gating amplifier 73 is synchronized with the movement of the scanning inspection beam of radiant energy across the interior surfaces of the container under inspection.

*Seam sensing circuit*

In addition to the connection to the coupling triode section 119, the output of phase-inverting amplifier 116 also is supplied through a conductor 42 to a sawtooth generating circuit formed by a pair of rectifier elements 123 and 124 connected in circuit relationship with a pair of resistors 125 and 126, and a pair of capacitors 127 and 128. The sawtooth generating circuit thus comprised serves to convert the square wave shape signal, such as is shown in Fig. 3d of the drawings, produced by the scanning register pulse generator 38 into a sawtooth wave shape signal, and supplies this sawtooth wave shape signal to the control grid of a seam pulse selector circuit formed by a triode section 129 of a duo-triode. The triode section 129 has the cathode thereof connected through a cathode load resistor to ground and the plate thereof connected to a source of plate potential through a suitable load resistor. A grid biasing potential is supplied to the cathode of triode section 129 from a voltage divider comprised by a resistor 131 and a capacitor 132 connected in series circuit relationship between the source of plate potential and ground.

In operation, seam pulse selector circuit formed by the triode section 129 serves to detect out a characteristic signal representative of the occurrence of a seam on the container under inspection.

The output signal pulse produced by the seam pulse selector circuit 129 is supplied through a unidirectional coupling device comprised of a rectifier element 137 to the input of a seam timing pulse generator. The seam timing pulse generator is similar in construction and operation to the scanning register pulse generators 106, 107 and comprises a pair of triode sections 138 and 139 of a duo-triode electron discharge device. Plate potentials are supplied to the anode of each of the triode sections 138 and 139 through respective plate load resistors, and in the case of triode section 139 through the resistor 114 also. The anode of the triode section 138 is connected through a coupling capacitor 141 to the control grid of the triode section 139, and the cathodes of the two triode sections are interconnected through a common cathode load resistor 142 to the ground terminal. A variable resistor 143 is connected between the control grid of triode section 139 and the source of positive potential supplied through conductor 53 to provide a leakage path for the coupling condenser 141, and a positive biasing potential is supplied to the control grid of the triode section 138 from a voltage divider comprised by a pair of series-connected resistors 144 and 145 connected between the source of positive potential and ground. The operation of the seam timing pulse generator is similar to the operation of scanning register pulse generator is similar to the operation of scanning register pulse generator 38 in that the triode section 138 normally is conductive, and, by reason of the positive bias produced across the common cathode load registor 142, the triode section 139 normally is non-conductive. Upon the passage of a negative trigger pulse to the anode of triode section 138 from seam pulse selector circuit 129 through the unidirectional coupling element 137, the triode section 138 is rendered non-conductive, thereby producing a positive pulse on the control grid of triode section 139 through coupling capacitor 141 and rendering triode section 139 conductive. Conduction through the triode section 139 produces a positive bias across the common cathode load resistor 142 which thereafter maintains triode section 138 in non-conducting condition until such time that the positive bias of capacitor 141 leaks off through the leakage resistor 143. Upon this occurrence triode section 139 becomes non-conducting and triode section 138 again is rendered conductive by reason of the positive bias supplied to the control grid thereof by voltage divider networks 144, 145 thereby returning the pulse generator to its initial operating state and completing the cycle.

The above operation results in the production of square wave output signal which is supplied through a coupling capacitor 146 to the control grid of a coupling triode section 147 having the cathode thereof connected through a suitable conductor to the cathode load resistor 74 of the signal gating amplifier 73. Hence, the resistor 74 serves as a common cathode load resistor for triode sections 73, 119 and 147. The biasing signal produced across the cathode load resistor 74 as a result of the square wave output of the seam timing pulse generator is of a polarity such that the signal gating amplifier 73 is rendered insensitive during the passage of a seam under the scanning inspection beam of radiant energy. In addition to the seam timing square wave pulse supplied through coupling tube 147, the seam timing pulse generator 138, 139 supplies a feedback control signal across the resistor 114 and conductor 47 to the control grid of the triode section 107 of the scanning register pulse generator 106, 107. This feedback signal is supplied for the purpose of reducing the duration of the scanning register output synchronizing signal pulse during the passage of a seam through the inspection zone. This reduction in timing of the scanning resistor output synchronizing signal pulse is necessitated by the fact that due to tabs and other irregularities at the ends of the containers in the region of the seam, the apparent length of the container as seen by the scanning beam of inspection radiant energy is shorter than it is for other portions of the interior surfaces of the containers, for if the timing of the scanning register signal pulses remained the same, then containers would falsely be rejected by prematurely appearing signals produced at the ends of the scans of the seam. The feedback signal supplied by the resistor 114 and conductor 47 corrects the need for the shortened period upon the occurrence of a seam by raising the potential of the resistor 114 a predetermined amount sufficient to shorten the time required for the coupling capacitor 108 to discharge sufficiently to render the triode section 107 conductive. As a consequence, the period of time that the triode section 107 is maintained conductive is shortened by the amount necessary to compensate for the apparent shortening of the containers in the region of the seams.

Having described in detail the construction of the detector portion of novel automatic inspection equipment comprised in the present invention, a description of the overall operation of the detector will be given. The varying output signal produced across the load resistor 54 by the photomultiplier tube 22 due to light specularly reflected from the interior surface of a container as it is rotated within the scanning inspection beam, is preamplified by the cathode follower amplifier 56, and supplied through connecting conductor 64 to differentiating amplifier 67. The output of differentiating amplifier 67 is connected through conductor 26 to diode rectifier 94 which acts in conjunction with the variable reactance tube 95 to vary the reactance contained in the voltage supply circuit to the photomultiplier tube 22 to maintain the background signal level output of the photomultiplier tube at some predetermined value. Simultaneously, the output signal of differentiating amplifier 67 also is supplied through phase inverting amplifier 71 to the control grid of signal gating amplifier 73.

In addition to the output signal from photomultiplier tube 22, signal gating amplifier 73 has two square wave shape gating signal pulses supplied thereto. The first of the square wave gating signal pulses is synchronized with the movement of the scanning inspection beam of radiant energy onto the leading edge of the container under inspection at the beginning of each scanning cycle, and with the movement of the scanning beam of inspection radiant energy over the trailing or farthermost edge of the container at the end of each scanning cycle. This square wave gating signal pulse is developed by the scanning register pulse generator 106, 107 in a manner hereinbefore explained, and is applied to the cathode load resistor 74 each time that the scanning inspection beam of radiant energy scans across the length of a container under inspection. This square wave gating signal pulse renders the amplifier 73 sensitive to pass flaw signals during the portions of the travel of the beam of inspection radiant energy over the interior surface of containers under inspection so that when no such signal is applied to the cathode load resistor, the signal gating amplifier is insensitive to any flaw signal that might be applied to the control grid thereof.

Simultaneously, with the development of the scanning register signal pulse, each time a seam comes within the inspection zone of the scanning beam of radiant energy, a seam gating signal pulse is automatically developed by the seam sensing circuit, and applied to the cathode load resistor 74 of gating amplifier 73 in reverse polarity to the scanning register gating signal pulse so as to render the amplifier insensitive during the passage of a seam through scanning inspection beam of radiant energy. The manner in which the scanning register signal pulse is developed has been described in detail in a preceding portion of this description. With regard to the seam timing signal pulse, the seam pulse selector circuit 129 serves to detect out a characteristic signal representative of the passage of a seam through scanning inspection beam of radiant energy. This characteristic signal is produced by reason of the scanning of the sloping edge of the seam as the seam enters into the inspection zone of scanning inspection beam of radiant energy. The sloping edge of this seam serves to deflect the beam of radiant energy to one side of the optical axis of the radiant energy transducing device formed by photomultiplier tube 22. The loss of light on the photomultiplier tube 22 results in the production of a signal such as appears at 133 in Fig. 3a where it can be seen there is no substantial leading edge signal pulse. The signal having this wave shape is differentiated by the differentiating amplifier to produce a signal having the wave shape shown in Fig. 3b. Because there is no sharp leading edge signal pulses at the beginning of each scanning cycle, the differentiated signal fails to have sufficient amplitude to reach an arbitrarily selected sensitivity control level indicated by the dotted line 134 in Fig. 3b. The control level is selected by the varying value of the negative bias developed across resistor 104, and supplied to the control grid of edge pulse selector tube 103. Because differentiation of a signal having the wave shape occurring at 133 in Fig. 3a does not produce a sufficiently large positive-going voltage peak, the edge pulse selector circuit 103 will not respond, and hence, no trigger pulse will be supplied to the scanning register signal pulse generator 38 by the selector circuit 103. As a result, the pulse generator formed by triode sections 106, 107 misses one cycle of operation thereby producing an output signal having a wave shape such as indicated at 135. This signal is phase inverted by the phase inverting amplifier and supplied to the sawtooth wave generating circuit formed by the rectifier elements 123 and 124, resistors 125 and 126, and capacitors 127, 128. Generating circuit then produces a sawtooth wave shape signal such as indicated in Fig. 3e of the drawings. As is illustrated in Fig. 3e the sawtooth wave form signal pulses produced by the sawtooth generating circuit attain a predetermined amplitude value for each cycle of operation of the pulse generator 38. By proper adjustment of the bias potential supplied to the cathode of the seam pulse bias selector circuit 129, the sensitivity of the seam pulse selector circuit may be adjusted so that the sawtooth wave shape signal pulses produced during each cycle of operation of the scanning register pulse generator are insufficient to render the pulse selector circuit 129 conductive. However, upon the scanning pulse signal generator missing a cycle of operation due to the occurrence of a seam, the output of the sawtooth generating circuit is allowed to rise in the manner shown at 130 in Fig. 3e to a magnitude higher than the bias value 134 supplied to the cathode of triode section 129 by the biasing circuit 131, 132. Hence, the triode section 129 will be rendered conductive to produce an output signal pulse in its plate circuit. This output signal pulse is supplied to the seam timing signal pulse generator 138, 139 through unidirectional conducting device 137, and triggers the pulse generator 138, 139 to its second state of operation in the manner previously described. The square wave seam blanking signal pulse having a wave shape such as shown in Fig. 3f, is then supplied through coupling triode section 147 to the common cathode load resistor 74. Hence, it can be appreciated that each of the gating square wave signal pulses are applied to the cathode load resistor 74 of signal gating amplifier for the purpose of selectively rendering the same sensitive during only the portions of the inspection beam of radiant energy travel where the beam impinges upon the interior surface of the container under inspection, and to render the signal gating amplifier insensitive during the passage of a seam through the inspection beam of radiant energy.

In addition to the main function described above, the signal gating amplifier 73 serves as a flaw signal pulse amplitude selector in that it has a negative bias applied thereto from the variable resistor 76. By adjusting the magnitude of the negative bias supplied to the control grid, the equipment can be adjusted to provide any desired sensitivity (that is to distinguish between different types of flaws occurring in the surface of the container under inspection).

Upon the occurrence of a flaw in the container under inspection at a time when the signal amplifier is gated on by the scanning register signal developing circuit, and there is no seam in the inspection zone of the equipment, such flaw signal is passed by the signal gating amplifier to the bistable multivibrator 33 to cause the multivibrator to switch from its initial operating state to a second operating state. Having once been triggered, the bistable multivibrator 33 remains in its second operating state throughout the remainder of the inspection of the container unit wherein the first flaw was detected. Hence, the occurrence of other flaws in the same container unit will not affect the operating condition of the bistable multivibrator, and hence, will not interfere with the operation of the rejection mechanism actuated by the bistable multivibrator. The bistable multivibrator 33 remains in its second operating state until such time that the container unit wherein the flaw occurred, is removed by the container rotating and handling equipment 18, and thereby opening the switch contacts of gating switch 19. The opening of the gating switch contacts returns the bistable multivibrator 73, 79 to its initial operating condition, and produces an output trigger pulse that is applied to the control grid of the grid control discharge device 88 thereby rendering that device conductive. When gas discharge device 88 is rendered conductive at the end of the inspection of one container unit, it energizes the winding 90 of the rejection mechanism control relay, thereby actuating the rejection mechanism. At this stage of the operation the switch contacts of the cam operated switch 93 are closed so that the relay winding 90 might properly be energized, and conduction can take place through the gas discharge tube 88. Subsequently, however, the cam operated switch 93 contacts are opened, thereby extinguishing the gas discharge device 88. The relay winding 90, however, remains energized due to the time delay impedance 92 connected across the windings thereof, and remains energized for a period of time sufficient to allow the container unit in which the flaw was detected to be removed by the container handling and rotating equipment and conveyed to a suitable point for rejection or other treatment. Subsequently, prior to the switch contacts of the gating switch 19 again being opened, the cam operated switch 93 closes its contact so that the cycle may again be repeated.

From the foregoing description, it can be appreciated that the invention provides an improved automatic container equipment which includes a means for delaying the action of a rejection mechanism associated with a rejection mechanism actuating relay for a predetermined period of time sufficient to allow a container unit under inspection to be removed from the inspection zone of the equipment by the container handling and rotating apparatus and conveyed to a suitable point for rejection or other treatment. By reason of the inclusion of the bistable multivibrator 33, the equipment also stores flaw information received at any particular point on a container unit for a period of time sufficient to allow completion of inspection of the entire container unit before such flaw information is utilized to actuate a reject mechanism relay. Hence, the reject mechanism will be actuated only once for any number of flaws occurring in one container unit. Further, the improved equipment includes a suitable means for properly synchronizing the periods that a reject mechanism actuating circuit can be energized with the periods that the scanning inspection beam of radiant energy impinges upon the interior surface of container units under inspection, and hence, minimizes the possibility of producing false rejection signals. The improved container inspection equipment also includes means for desensitizing the rejection mechanism actuating circuit upon the passage of a seam through the inspection zone of the equipment thereby further preventing the occurrence of false rejection signals by reason of the occurrence of the seam.

In the light of the foregoing description, other modifications and variations of the invention will be suggested by those skilled in the art. It is therefore, to be understood that changes may be made herein which are within the full intended scope of the invention as defined by the appended claims.

What I claim as new and desire to secure by Letters Patent of the United States is:

1. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, and a rejection mechanism actuating circuit operatively coupled to the output of said radiant energy transducing device, said actuating circuit comprising a bistable multivibrator having two stable states of operation, the multivibrator normally being in the first of the states of operation thereof and being switched to the second state of operation upon the occurrence of a flaw signal, and means connected to said multivibrator for returning the multivibrator to the first of the states of operation thereof upon the completion of examination of a container unit under inspection.

2. The combination set forth in claim 1 further characterized by a rejection mechanism operatively coupled to the output of the bistable multivibrator and comprising a solenoid operated relay having a time delay resistance connected in parallel circuit relationship with the reactance of the energizing winding thereof.

3. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device and a rejection mechanism actuating circuit operatively coupled to the output of said radiant energy transducing device through said gating device, and a scanning register signal developing circuit having the input thereof operatively coupled to the output of said radiant energy transducing device and having the output thereof coupled to said gating device for controlling action of the same, said last-mentioned circuit serving to develop a scanning register signal for rendering said gating device operative during those portions of the scanning beam of radiant energy travel where the beam impinges on the interior surface of a container under inspection.

4. The combination set forth in claim 3 further characterized by a rejection mechanism operatively coupled to the output of the actuating circuit and comprising a solenoid operated relay having a time delay reactance connected in parallel circuit relationship with the energizing winding thereof.

5. The combination set forth in claim 3 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection.

6. The combination set forth in claim 3 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein the combination is further characterized by a rejection mechanism operatively coupled to the output of the rejection mechanism actuating circuit and comprising a solenoid operated relay having a time delay resistance connected in parallel circuit relationship with the reactance of the energizing winding thereof.

7. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device and a rejection mechanism actuating circuit operatively coupled to the output of said radiant energy transducing device through said gating device, said actuating circuit including a bistable multivibrator having two stable states of operation, the multivibrator normally being in the first of the states of operation thereof and being switched to the second state of operation upon the application of flaw signals thereto by said gating device, means connected to said multivibrator for returning the multivibrator to the first state of operation thereof upon the completion of examination of a container unit under inspection, a scanning register signal developing circuit having the input thereof operatively coupled to the output of said radiant energy transducing device and having the output thereof coupled to said gating device for controlling the action of the same, said last-mentioned circuit serving to develop a scanning register signal for rendering said gating device operative during those portions of the scanning beam of radiant energy travel where the beam impinges on the interior surface of a container under inspection.

8. The combination set forth in claim 7 further characterized by a rejection mechanism operatively coupled to the output of the bi-stable multivibrator and comprising a solenoid operated relay having a time delay resistance connected in parallel circuit relationship with the reactance of the energizing winding thereof.

9. The combination set forth in claim 7 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection.

10. The combination set forth in claim 7 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein the combination is further characterized by a rejection mechanism operatively coupled to the output of the rejection mechanism actuating circuit and comprising a solenoid operated relay having a time delay reactance connected in parallel circuit relationship with the reactance of the energizing winding thereof.

11. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device, and a rejection mechanism actuating circuit operatively coupled to the output of said radiant energy transducing device through said gating device, a rejection mechanism operatively coupled to the output of said actuating circuit and comprising a solenoid operated relay having a time delay resistance connected in parallel circuit relationship with the reactance of the energizing winding thereof, and a seam sensing circuit having the input thereof operatively coupled to the output of said radiant energy transducing device and having the output thereof coupled to said gating device for controlling the action of said gating device, said seam sensing circuit serving to detect the occurrence of a seam on the interior surface of a container and to develop a blanking signal for rendering said gating device insensitive during the passage of the beam of radiant energy over the seam.

12. The combination set forth in claim 11 wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator.

13. Inspection apparatus for inspecting the interior surface of open-ended containers which are rotatable about an axis thereof extending through both open ends of the container comprising radiant energy scanning means positioned adjacent one open end of a container under inspection for periodically scanning the interior surface of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device, and a rejection mechanism actuating circuit operatively coupled to the output of said radiant energy transducing device through said gating device, said actuating circuit including a bi-stable multi-vibrator having two stable states of operation, the multi-vibrator normally being in the first of the states of operation thereof and being switched to the second state of operation upon the application of flaw signals thereto by said gating device, means connected to said multivibrator for returning the multivibrator to the first state of operation thereof upon the completion of examination of a container unit under inspection, and a seam sensing circuit having the input thereof operatively coupled to the output of said radiant energy transducing device and having the output thereof coupled to said gating device for controlling the action of said gating device, said seam sensing circuit serving to detect the occurrence of a seam on the interior surface of a container and to develop a blanking signal for rendering said gating device insensitive during the passage of the beam of radiant energy over the seam.

14. The combination set forth in claim 13 further characterized by a rejection mechanism operatively coupled to the output of the bi-stable multivibrator and comprising a solenoid operated relay having a time delay resistance connected in parallel circuit relationship with the reactance of the energizing winding thereof.

15. The combination set forth in claim 13 wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator.

16. The combination set forth in claim 13 wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those characteristic pulses caused by the occurrence of a seam on the interior surface of the container, a radiant energy pulse generator for generating the scanning radiant energy beam coupled to the output of said pulse signal amplitude selector circuit, and means for varying the length of the operating period of said pulse generator, and wherein the combination is further characterized by a rejection mechanism operatively coupled to the output of the rejection mechanism actuating circuit and comprising a solenoid operated relay having a time delay resistance connected in parallel circuit relationship with the reactance of the energizing winding thereof.

17. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device, and a rejection mechanism actuating circuit operatively coupled to the output of said radiant energy transducing device through said gating device, a scanning register signal developing circuit having the input thereof operatively coupled to the output of said radiant energy transducing device and having the output thereof coupled to said gating device for controlling the action of the same, said last-mentioned circuit serving to develop a scanning register signal for rendering said gating device operative during those portions of the scanning beam of radiant energy travel where the beam impinges on the interior surface of a container under inspection, and a seam sensing circuit having the input thereof operatively coupled to the output of said radiant energy transducing device and having the output thereof coupled to said gating device in parallel with the output of said scanning register signal developing circuit for controlling the action of said gating device, said seam sensing circuit serving to detect the occurrence of a seam on the interior surface of a container and to develop a blanking signal for rendering said gating device insensitive during the passage of the beam of radiant energy over the seam.

18. The combination set forth in claim 17 further characterized by a rejection mechanism operatively coupled to the output of the actuating circuit and comprising a solenoid operated relay having a time delay resistance connected in parallel circuit relationship with the reactance of the energizing winding thereof.

19. The combination set forth in claim 17 further characterized by feedback control means interconnecting said scanning register signal developing circuit with said seam sensing circuit for automatically reducing the period of the scanning register signal produced by said scanning register signal developing circuit upon the occurrence of a seam.

20. The combination set forth in claim 17 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said last-mentioned pulse generator.

21. The combination set forth in claim 17 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by feedback control means interconnecting said scanning register signal developing circuit with said seam sensing circuit for automatically reducing the period of the scanning register signal produced by said scanning register signal developing circuit upon the occurrence of a seam.

22. The combination set forth in claim 17 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by feedback control means interconnecting said scanning register signal developing circuit with said seam sensing circuit for automatically reducing the period of the scanning register signal produced by said scanning register signal developing circuit upon the occurrence of a seam, and a rejection mechanism operatively coupled to the output of the actuating circuit and comprising a solenoid operated relay having a time delay resistance connected in parallel circuit relationship with the reactance of the energizing winding thereof.

23. Inspection apparatus for inspecting the interior surface of open-ended containers which are rotatable about an axis thereof extending through both open ends of the container comprising radiant energy scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a utilization circuit coupled to the output of said radiant energy transducing means and comprising an electric signal gating device, and a rejection mechanism actuating circuit operatively coupled to the output of said radiant energy transducing device through said gating device, said actuating circuit including a bi-stable multivibrator having two stable states of operation, the multivibrator normally being in the first of the operating states thereof and being switched to the second state of operation upon the application of flaw signals thereto by said gating device, means connected to said multivibrator for returning the multivibrator to the first state of operation thereof upon the completion of examination of a container unit under inspection, a scanning register signal developing circuit having the input thereof operatively coupled to the output of said radiant energy transducing device and having the output thereof coupled to said gating device for controlling the action of the same, said last-mentioned circuit serving to develop a scanning register signal for rendering said gating device operative during those portions of the scanning beam of radiant energy travel where the beam impinges on the interior surface of a container under inspection, a seam sensing circuit having the input thereof operatively coupled to the output of said radiant energy transducing device and having the output thereof coupled to said gating device in parallel with the output of said scanning register signal developing circuit for controlling the action of said gating device, said seam sensing circuit serving to detect the occurrence of a seam on the interior surface of a container and to develop a blanking signal for rendering said gating device insensitive during the passage of the beam of radiant energy over the seam.

24. The combination set forth in claim 23 further characterized by a rejection mechanism operatively coupled to the output of the bi-stable multivibrator and comprising a solenoid operated relay having a time delay reactance connected in parallel circuit relationship with the energizing winding thereof.

25. The combination set forth in claim 23 further characterized by feedback control means interconnecting said scanning register signal developing circuit with said seam sensing circuit for automatically reducing the period of the scanning register signal produced by said scanning register signal developing circuit upon the occurrence of a seam.

26. The combination set forth in claim 23 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator.

27. The combination set forth in claim 23 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by feedback control means interconnecting said scanning register signal developing circuit with said seam sensing circuit for automatically reducing the period of the scanning register signal produced by said scanning register signal developing circuit upon the occurrence of a seam.

28. The combination set forth in claim 23 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection, and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by feedback control means interconnecting said scanning register signal developing circuit with said seam sensing circuit for automatically reducing the period of the scanning register signal produced by said scanning register signal developing circuit upon the occurrence of a seam, and a rejection mechanism operatively coupled to the output of the actuating circuit and comprising a solenoid operated relay having a time delay resistance connected in parallel circuit relationship with the reactance of the energizing winding thereof.

29. Inspection apparatus for inspecting the interior surface of open-ended containers which are rotatable about an axis thereof extending through both open ends of the container including in combination radiant energy transmitting and scanning means positioned adjacent one open end of a container under inspection for periodically scanning the interior surfaces of the container with a beam of radiant energy as the same is rotated, radiant energy transducing means positioned adjacent the remaining open end of the container under inspection for receiving radiant energy specularly reflected from the interior surface of the container and developing an electric signal therefrom that is representative of the condition of the interior surface of the container, a differentiating amplifier circuit coupled to the output of radiant energy transducing device, a utilization circuit coupled to the output of said differentiating amplifier circuit including an electric signal gating device, a rejection mechanism actuating circuit operatively coupled to the output of said differentiating amplifier circuit through said gating device, said actuating circuit comprising a bi-stable multivibrator having two stable states of operation and adapted to be switched from one of the operating states thereof to the other upon the passage of a flaw signal thereto by said gating device, means connected to said multivibrator for returning the multivibrator to the first state of operation thereof upon the completion of examinaion of a container unit under inspection, a grid controlled gas discharge tube having the control grid thereof coupled to the output of said bi-stable multivibrator, and a solenoid operated relay having a time delay resistance connected in parallel circuit relationship with the reactance of the energizing coil thereof and having the said energizing coil connected in the output circuit of said gas discharge tube, a scanning register signal developing circuit having the input thereof operatively coupled to the output of said radiant energy transducing device and having the output thereof coupled to said gating device for controlling the action of the same, said last-mentioned circuit serving to develop a scanning register signal for rendering said gating device operative during those portions of the scanning beam of radiant energy travel where the beam impinges on the interior surface of a container under inspection, and a seam sensing circuit having the input thereof operatively coupled to the output of said radiant energy transducing device and having the output thereof coupled to said gating device in parallel with the output of said scanning register signal developing circuit for controlling the action of said gating device, said seam sensing circuit serving to detect the occurrence of a seam on the interior surface of a container and to develop a blanking signal for rendering said gating device insensitive during the passage of the beam of radiant energy over the seam.

30. The combination set forth in claim 29 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator.

31. The combination set forth in claim 29 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by a rejection mechanism operatively coupled to the output of the actuating circuit and comprising a solenoid operated relay having a time delay resistance connected in parallel circuit relationship with the reactance of the energizing winding thereof.

32. The combination set forth in claim 29 wherein said scanning register signal developing circuit comprises a leading edge signal pulse selector circuit having the input thereof operatively coupled to the output of said radiant energy transducing device, a pulse generator having the input thereof operatively coupled to the output of said leading edge signal pulse selector circuit, means for controlling the operating period of said pulse generator, and coupling circuit means for coupling the output of said pulse generator to said gating device to control the action of said device to render the same operative during the portion of each scan of the inspection beam of radiant energy where the beam impinges upon the interior surface of a container under inspection and wherein said seam sensing circuit comprises a sawtooth signal developing circuit operatively coupled to the output of said radiant energy transducing device, a pulse signal amplitude selector circuit coupled to the output of said sawtooth signal developing circuit for selectively passing only those signals representative of the appearance of a seam into the inspection beam of radiant energy, a pulse generator coupled to the output of said pulse signal amplitude selector circuit, and means for varying the length of the operating period of said pulse generator, the combination being further characterized by a rejection mechanism operatively coupled to the output of the actuating circuit and comprising a solenoid operated relay having a time delay resistance connected in parallel circuit relationship with the reactance of the energizing winding thereof, and an amplitude control circuit comprising a rectifier circuit operatively coupled to the output of said radiant energy transducing device, and a variable reactance controlled by said rectifier and connected in electrical circuit relationship with said radiant energy transducing device for controlling the amplitude of the output electric signal developed by said transducing device.

References Cited in the file of this patent

UNITED STATES PATENTS

| | | |
|---|---|---|
| 2,051,695 | Glacy | Aug. 18, 1936 |
| 2,612,994 | Woodland et al. | Oct. 7, 1952 |
| 2,624,786 | Potter | Jan. 6, 1953 |
| 2,663,758 | Shepard | Dec. 22, 1953 |